July 14, 1959 W. E. BRILL 2,894,407
POWER TRANSMITTING MECHANISM
Filed June 25, 1956 4 Sheets-Sheet 1

INVENTOR
*William Elmer Brill*
BY
*J. C. Thorpe*
ATTORNEY.

INVENTOR.
William Elmer Brill

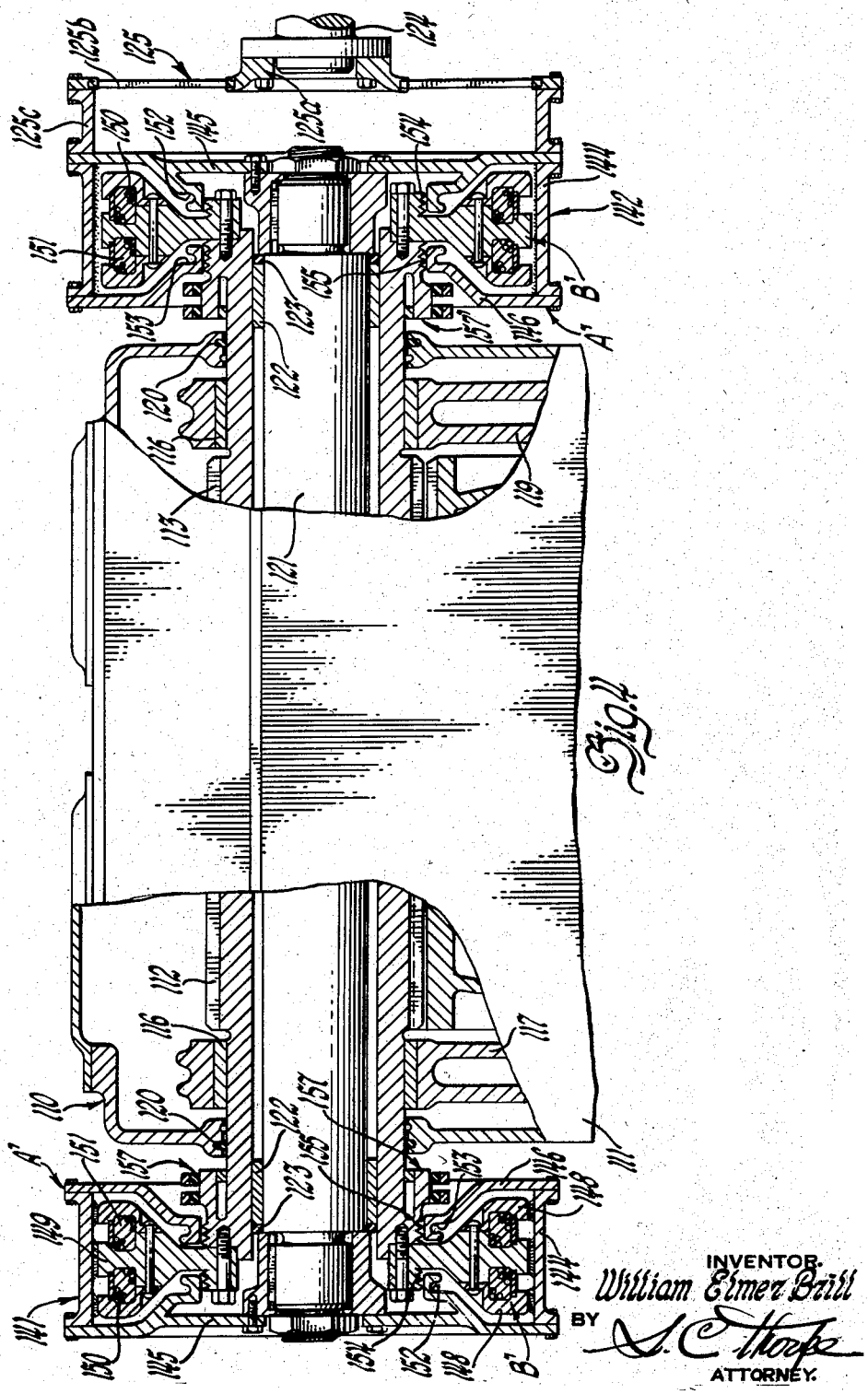

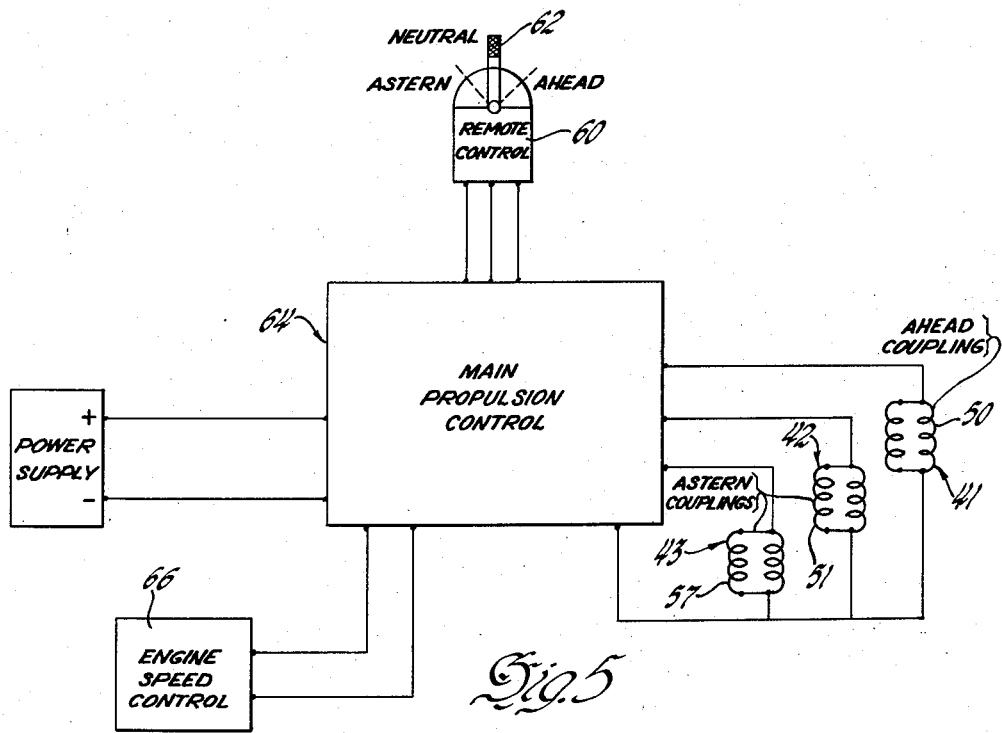

United States Patent Office 2,894,407
Patented July 14, 1959

2,894,407
POWER TRANSMITTING MECHANISM

William E. Brill, Indianapolis, Ind., assignor to General Motors Corporation, Detroit, Mich., a corporation of Delaware Application June 25, 1956, Serial No. 593,502

13 Claims. (Cl. 74—361)

This invention relates generally to power transmitting mechanism; more particularly to a transmission having a plurality of alternative gear drive paths and including magnetic particle coupling means for selectively controlling the drive path therethrough; and with regard to certain more specific aspects thereof to a reduction and reversing transmission particularly adapted for marine propulsion drive.

The invention has among its principal objects: to provide an improved power transmitting mechanism; to provide an improved power transmitting mechanism including magnetic particle coupling drive control mechanism; to provide a power transmitting mechanism including gearing with magnetic particle coupling drive control mechanism which is isolated from such gearing and readily accessible for inspection and maintenance; to provide a power transmitting mechanism with a plurality of magnetic particle coupling drive control means comprised of interchangeable components thereby reducing the costs of manufacture, inventory and maintenance; to provide an improved form of reversing and reduction transmission which is particularly adapted for marine use; and to provide an improved form of reversing and reduction transmission which is particularly adapted for marine use utilizing magnetic particle coupling drive control means so constructed and arranged as to facilitate maneuvering of the boat in which the gear is arranged, to reduce abrasive windage of the magnetic particles in the deenergized magnetic particle couplings, and to isolate the magnetic particles from the lubricated portions of the transmission and the lubricant from the couplings.

The foregoing and other objects, advantages and features of the invention will become apparent from the following description of several preferred embodiments thereof having reference to the accompanying drawings, in which:

Figure 4 is a view similar to Figure 1 showing a modified form of the invention, and Figure 5 is a diagrammatic view of a remote control system operable to selectively control the forms of the power transmitting mechanisms of Figures 1–3 and Figure 4.

Figure 1:
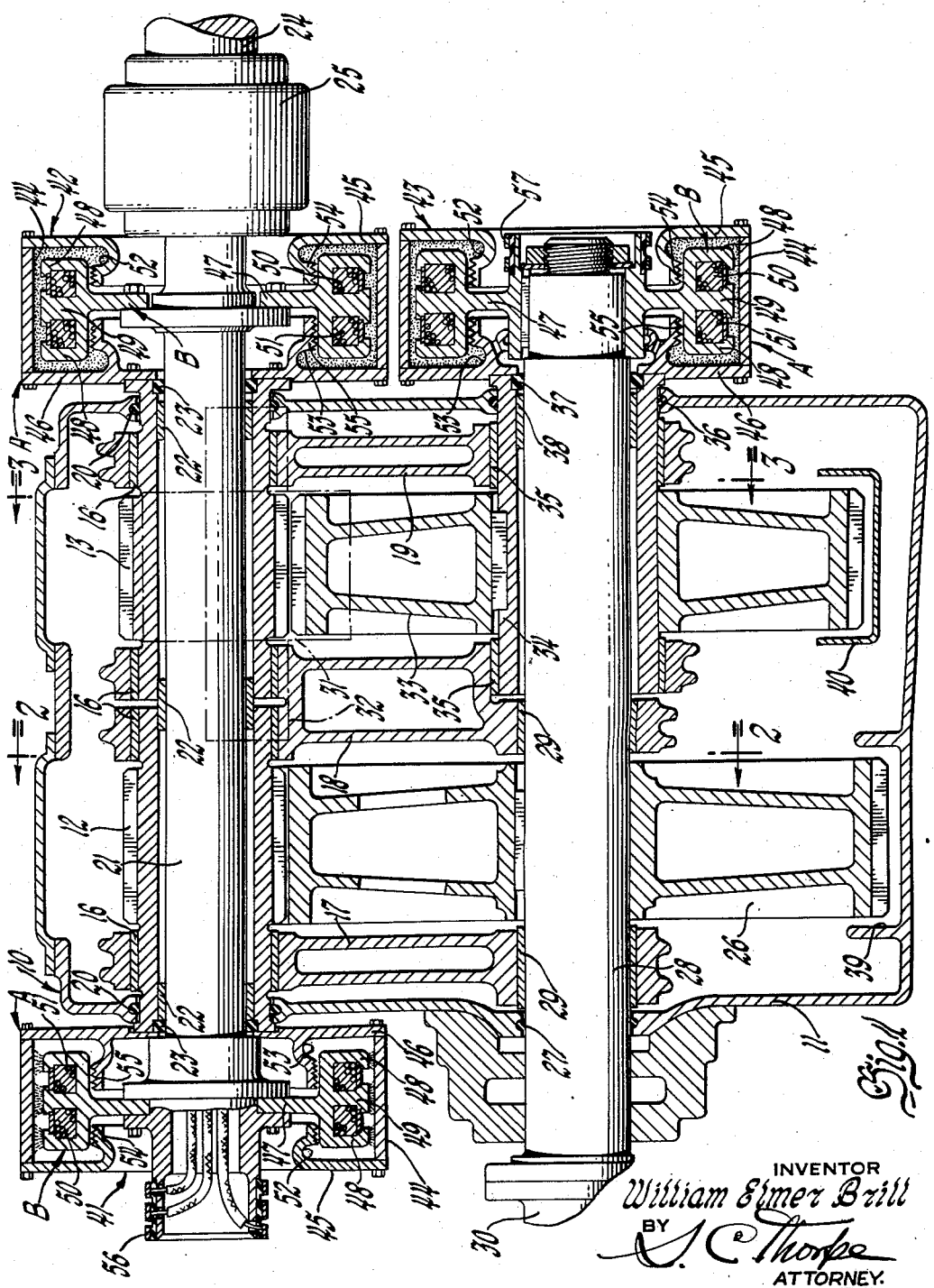
Figure 1 is a somewhat diagrammatic sectional view of a power transmitting mechanism constructed in accordance with the invention.
Figure 2:
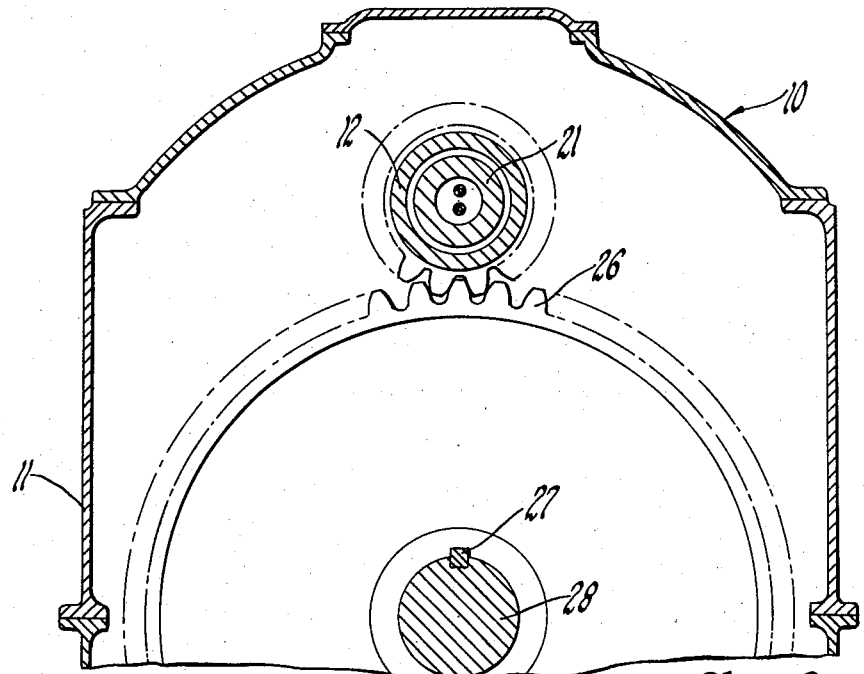
Figure 2 is a sectional view taken substantially on the line 2—2 of Figure 1.
Figure 3:
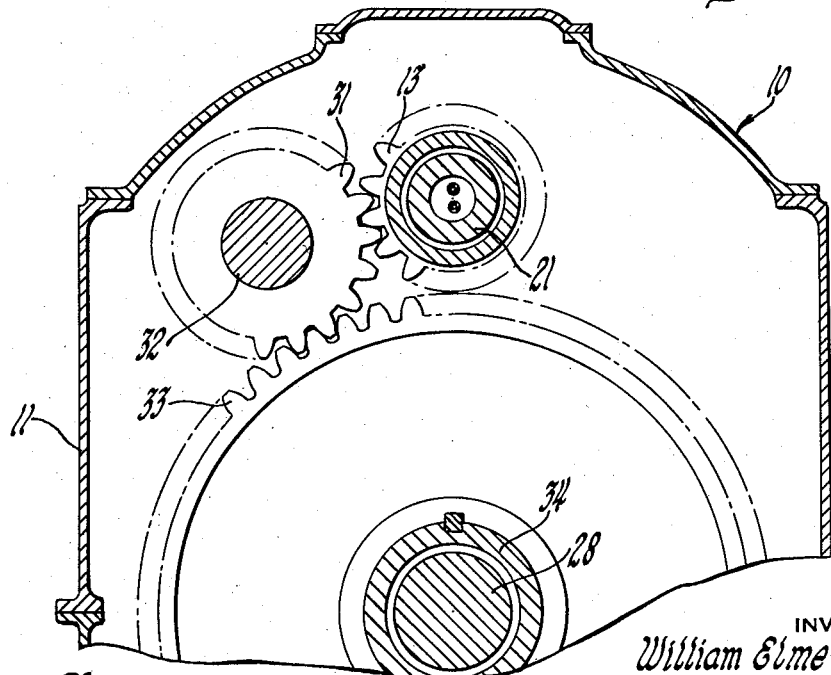
Figure 3 is a sectional view taken substantially on the line 3—3 of Figure 1.

Referring more particularly to the drawings, Figure 1 shows a reverse and reduction gear mechanism 10 including a housing or case 11 in which the operating parts of the gear mechanism are arranged and supported. Two gears 12 and 13 serving as ahead and astern driving pinions, respectively, are each formed externally of substantially cylindrical hub or shaft portions which are journaled in axially spaced and aligned relation within the housing by bushings 16 carried by webs 17, 18 and 19 extending transversely of the housing. The oppositely disposed hub portions of the gear members 12 and 13 project outwardly from the ends of the housing and are sealed with respect thereto by suitable oil seals shown diagrammatically at 20.

A shaft 21 is journaled within the pinion gear members 12 and 13 by suitable bearings 22. This shaft is of a length to extend beyond the outer ends of the pinions and is sealed with respect thereto by suitable oil seals, indicated at 23. The shaft 21 constitutes the input or driving member of the gear mechanism. As viewed in Figure 1, the right end of the shaft 21 is drivingly connected to a power shaft 24 of a prime mover through a flexible coupling 25 which is adapted to accommodate limited lateral and angular misalignment between the shafts 21 and 24.

The ahead pinion 12 drivingly engages a bull gear 26 keyed to a second shaft 28 which serves as the driven or output member of the gear mechanism. The shaft 28 is rotatably mounted within the housing in parallel relation to the input shaft 21 by bushings 29 carried by the housing webs 17 and 18. The shaft 28 is also of a length to extend through the oppositely disposed ends of the gear case or housing 11. The left end of the shaft 28 as viewed in Figure 1 is connected to a propeller shaft 30 and is sealed with respect to the housing by a suitable oil seal 27. The connection between the shafts 28 and 30 may be either of a rigid flanged type, as shown, or may be a flexible coupling similar to that shown at 25.

The astern pinion 13 meshes with an idler gear 31 mounted on a counter shaft 32 which is suitably journaled in the webs 18 and 19. In the embodiment shown the idler gear drivingly engages a second bull gear 33. The bull gear 33 is suitably keyed to a cylindrical shaft member 34 which embraces the shaft 28 and is rotatably mounted in bushings 35 carried by the webs 18 and 19. One end of the shaft member 34 projects outwardly of the housing and is sealed with respect to the housing and the shaft 28 by suitable seals 36 and 37, respectively. A bushing 38 interposed between the outer end of the shaft member 34 and the shaft 28 insures their concentricity.

The gear meachanism 10 is primarily lubricated by rotation of the bull gears 26 and 33 in lubricant supply troughs 39 and 40, respectively, provided in the lower portion of the case 11. Such rotation carries lubricant to the mating gear teeth of the pinions and establishes a spray or splash which serves to lubricate the journals. It is contemplated that other more positive type lubricant supply means may be provided for the journals if necessary in a particular application.

The drive through the gear mechanism 10 is selectively controlled by means of a plurality of magnetic particle or magnetic fluid couplings. Preferably these couplings are identical and of a construction to provide maximum interchangeability of components, thus reducing the cost of manufacture, parts inventory and maintenance. In accordance with the invention, these couplings are mounted externally of the gear case 11. In forward drive, the ahead pinion 12 is coupled to the driving input shaft 21 by a magnetic particle clutch or coupling 41. In astern drive, the astern pinion 13 is coupled to the driving input shaft 21 by a magnetic particle clutch 42; and the cylindrical shaft 34, and hence the astern bull gear 33 is subsequently or simultaneously coupled to the driven output shaft 38 by a magnetic particle clutch 43.

Each of the couplings 41, 42 and 43 includes an annular inductor drum assembly A comprising a cylindrical member 44 interposed between two end plates 45 and 46. The end plate 46 of each of the couplings is provided with an inwardly extending flange which is suitably secured to the adjacent end of the gear carrying shafts 12, 13 and 34, respectively. Each drum assembly A spacedly embraces an annular electromagnetic field pole assembly B comprising a pole member 47 having two axially spaced annular poles 48 of the same polarity spacedly flanking a central annular pole 49 of the opposite polarity. The poles 48, 49 form two outwardly-facing annular grooves or pockets which serve to mount two oppositely-wound annular field coil windings 50, 51. The pole member 47 of each assembly B is adapted to be driven by either shaft 21 or 28, as the case may be, being provided with an inwardly extending spider portion which is secured to the adjacent end of the shaft 21 or 28.

A mixture of magnetic particles is interposed in the annular space between the assemblies A and B and sealed therein by suitable means. In the embodiment shown in Figure 1, the sealing means provided includes annular particle collecting pockets 52 and 53 formed by reverse-bend portions of the end plates 45 and 46, respectively. These reverse-bend portions bring the inner portions of the end plates in to spaced concentric relation with the inner surfaces of the pole member flanking the spider portion. These inner portions of the end plates are externally threaded as indicated at 54 and 55. The hands of the threads 54 and 55 are oppositely disposed and are such that relative rotation between the assemblies A and B when the coupling is deenergized causes any magnetic particles tending to pass between the end plates and the pole member to be returned within the coupling by the helices of the threads. When the coupling is energized the magnetic field and centrifugal forces coact to return the particles outwardly within the coupling.

The field coil windings 50, 51 of each of the couplings 41, 42 are selectively and progressively energizable by operation of a suitable control mechanism through slip ring connections, shown at 56, for the couplings 41 and 42 and at 57 for the coupling 43. As shown diagrammatically in Figure 5, the control mechanism preferably includes a remote controller unit 60 of a conventional quadrant-type having a single lever 62. The remote control unit 60 is adapted to control the energization of a main propulsion control unit 64 and thereby the energization of the ahead coupling 41 upon movement of the lever 62 in one direction from a neutral position and to similarly control the energization of the aft couplings 42 and 43 upon movement in the opposite direction. The propulsion control unit 64 is also preferably adapted to control the speed of the engine through the operation of a suitable engine speed control unit 66, i.e. a variable speed governor, in accordance with the degree of movement of the control lever from its neutral position. Energization of the field coil windings 50, 51 of each of the electromagnetic assemblies B serves to establish a magnetic field of controllable intensity bridging the annular space or air gap between the associated assemblies A and B. The establishment of such a magnetic field tends to effect a load transmitting magnetic bond through the magnetic particle mixture between the assemblies A and B. The torque transmitting characteristic of the magnetic bond thus established is generally proportional to the controlled intensity of the field input up to a point at which the assemblies A and B are effectively locked together.

To establish forward drive through the power transmitting mechanism of the embodiment of Figure 1, assuming the engine to be operating at normal idle speed and the controller lever 62 to be in its neutral position, the controller lever is advanced in a forward direction. The initial movement of the controller lever in this direction results in the progressive energization of the field coil windings 50, 51 of the coupling 41; the couplings 42 and 43 remaining deenergized. The initial energization of the coupling 41 tends to establish a driving connection but permits relative slippage between the inductor drum assembly A and the pole member 47, and thereby between the driving input shaft 21 and the output shaft 28. However, as the controller lever is advanced further in the forward direction, the energization of the coupling 41 is increased up to a point where the inductor drum assembly and thereby the output shaft 28 are effectively locked to the pole member 47 through the bonding action of the magnetic particles. Beyond this point further advancing of the controller in the forward direction serves to advance the speed of the engine through the operation of the speed control unit 66.

Thus, it will be seen that by effectively varying the electromagnetic field strength the controller 60 is effective to control the output shaft speed between zero speed up to a speed corresponding to the engine idle speed, at which point the energization or field strength of the forward coupling 41 is such as to effectively lock up the input and output members of the coupling, and that the controller is effective beyond this point to control output shaft speed by varying the engine speed.

It will be noted that when the ahead coupling is energized, the forward rotation of the driven shaft 28 serves to drive the field pole assembly of the coupling 43, but inasmuch as the coupling 43 is not energized, this driving action is not transmitted to the inductor drum assembly of the coupling and thereby to the bull gear 33, the countershaft idler 31 and the reverse pinion. Such rotation of the pinion 13, if permitted, would serve to drive the inductor drum assembly A of the coupling 42 at a speed substantially equal to the rotational speed of the input shaft 21 and the field pole assembly at the coupling. However, the rotation of the inductor drum would be counter the rotation of the shaft 21. Consequently, the relative rotation between the inductor drum A and the field pole assembly B of the coupling 42 would be twice the speed of the shaft 21. Such relative rotation would be imparted to the magnetic particles adjacent the two assemblies and would result in excessive turbulence and windage of the magnetic particles thereby compounding the wear and particle sealing problems inherent in such couplings. The heat generated by such turbulence and windage under certain operating conditions may also result in fusion of the particles, seizure of the coupling, and destructive heating of the opposed air gap surfaces of the inductor drum and field pole assemblies.

To establish reverse drive, assuming the controller lever 62 to be in its full speed ahead position, the controller lever is moved in the opposite or reverse direction, first reducing the engine to its engine idle speed and then progressively deenergizing the coupling 41. As the controller lever is moved past its neutral position, the coupling 41 is completely deenergized. Further movement of the lever into the aft sector of the controller quadrant and acting through the main propulsion control unit serves to either sequentially or simultaneously energize the field coil windings of the couplings 42 and 43 thereby tending to establish a driving connection between the shaft 21 and the astern pinion, and between the output shaft 28 and the astern bull gear shaft 34, respectively. Preferably the initial energization of one of the couplings 42 or 43 is sufficient to provide a lock-up bonding action through the magnetic particles of the particular coupling. The energization of the other coupling is progressively controlled by the further movement of the controller lever to provide reverse speed control for the output shaft from zero to a reverse speed corresponding to engine idle. As in forward drive, still further movement of the controller lever in the reverse direction beyond this point controls the speed of the engine to achieve the desired output shaft speed.

It will be noted that when reverse drive is established through the power transmitting mechanism, relative rotation between the inductor drum and the field pole assembly of the coupling 41 will occur. However, inasmuch as such reverse operation will be for relatively short periods of time during relatively slow speed ship maneuvering operations, a second ahead coupling corresponding to the second reverse coupling 43 will not be necessary generally for most marine applications. However, it will be understood that in certain applications, such as tugboats and ferries, where the operational time is almost equally divided between forward and reverse drive that such a second forward coupling might be necessary. As indicated above, it is also contemplated that in certain applications the second reverse coupling 43 may not be necessary where the relative rotational speeds of the coupling assemblies are sufficiently low and the operational time in forward and reverse drive is substantially equal and of relatively short duration.

In the embodiment of the invention shown in Figure 4, the driving-driven relationship of the inductor drum and electromagnetic field pole assemblies is reversed from that of the embodiment of Figure 1; the inductor drum assemblies constituting the driving or input member of the coupling and the electromagnetic field pole assemblies constituting the driven member. This results in minor differences in the structural arrangement of the several components. Hence, the parts in the embodiment of Figure 4 corresponding to similar parts in the embodiment of Figure 1 are designated by the same number plus 100.

Referring more particularly to Figure 4, a reverse and reduction gear mechanism 110 is shown in elevation with portions thereof broken away and in section. The gear mechanism 110 includes a gear case 111 rotatably mounting an ahead pinion 112 and an astern pinion 113 in aligned and axially spaced relation in bushings 116 carried by webs, 117 and 119 being shown, extending transversely of the housing. The pinion gears 112 and 113 are provided with cylindrical hub portions which project outwardly of the housing and which are sealed with respect thereto by suitable oil seals 120. A driving or input shaft 121 is rotatably mounted in axially spaced bearings 122 which are mounted internally of the pinions 112 and 113. The ends of the shaft 121 project outwardly beyond the ends of the pinion gears 112 and 113 and are sealed with respect thereto by suitable seals 123.

Magnetic particle couplings 141 and 142 of identical construction are mounted externally of the gear case 111 and drivingly interconnect the shaft 121 with either the pinion 112 in ahead drive, or with the astern pinion 113 in astern drive. Inductor drum assemblies A' of the couplings 141 and 142 each include a cylindrical member 144 interposed between two end plates 145 and 146. Each of the end plates 145 is provided with an inwardly extending flange which is suitably secured to the adjacent end of the shaft 121. Adjacent its outer periphery, the inductor drum assembly A' of the coupling 142 is connected to the crankshaft of the engine 124 by a flexible coupling 125 including a hub portion 125a secured to the engine driven shaft 124, a plurality of radially extending leaf springs 125b, and a load transmitting collar 125c which is secured to the end plate 145 of the coupling 142. Electromagnetic field pole assemblies B' of the couplings 141 and 142 each comprise a central pole piece 149 having a spider portion secured to the end of the associated pinion gear. The pole piece 149 is flanked by two pole pieces 148 which define two outwardly facing annular grooves or pockets for mounting oppositely wound field coil windings 150 and 151. The magnetic particle mixture interposed in the space between the assemblies A' and B' is sealed therein by particle collecting pockets 152, 153 and threads 154, 155 formed on the cover members 145, 146, respectively, in concentric relation to the hub of the field pole assemblies B'.

As with the embodiment of Figure 1, the field coil windings of the couplings 141 and 142 by the operation of a control mechanism such as shown in Figure 5 are energizable through suitable slip ring assemblies 157 and 157', respectively, which are mounted inboard of the couplings on the hubs of the pinion gears 112 and 113, respectively. The operation of the power transmitting mechanism of the embodiment of Figure 4 is substantially identical with that shown in Figure 1 and consequently is not described in detail.

From the foregoing description of two preferred embodiments it will be seen that the invention provides a relatively compact and improved power transmitting mechanism having a plurality of interchangeable magnetic particle coupling means for selectively and progressively controlling the transmission drive path and the speed of the output or driven shaft; the couplings being mounted externally of the housing for the gearing. This external mounting of the magnetic particle couplings permits the use of separate oil and particle seals and completely isolates the magnetic particles from the lubricated portions of the transmission and the lubricant from the couplings. With this mounting arrangement, the magnetic particle couplings are readily accessible for maintenance and inspection and the alignment between the inductor drum and field pole assemblies of each magnetic particle coupling is definitely maintained independently of the alignment between the engine, the gear mechanism and the propeller shaft.

While the foregoing description and figures have been confined to two specific embodiments of the invention, it will be apparent to those skilled in the art that numerous modifications can be made without departing from the spirit and scope of the inventive concepts thereof. Accordingly, it is to be understood that the foregoing is to be interpreted as illustrative only and not in a limiting sense, reference being had to the appended claims to determine the scope of the invention.

I claim:

1. In a power transmitting mechanism, the combination comprising a reverse gear mechanism including a housing, two hollow shaft members rotatably mounted in said housing in spaced axial relation, the oppositely disposed ends of said shaft members projecting externally of said housing, an ahead drive pinion carried by one of said hollow shaft members, an astern drive pinion carried by the other of said hollow shaft members, a driving shaft rotatably mounted within said hollow shaft members and adapted to be driven by a prime mover, an output shaft rotatably mounted in said housing in spaced parallel relation to said driving shaft, a bull gear secured to said output shaft and having constant mesh with the ahead drive pinion, a third hollow shaft member concentrically embracing said output shaft and rotatably mounted with respect to said housing and said output shaft, a second bull gear carried by said third hollow shaft member and having a countershaft-mounted idler gear drivingly interconnecting said astern pinion and second bull gear, and magnetic particle coupling means mounted externally of said reverse gear housing for selectively interconnecting said driving and driven shafts with said gear carrying shafts.

2. In the combination set forth in claim 1, said magnetic particle coupling means including a first magnetic particle clutch mounted externally of said reverse gear housing and adapted to drivingly interconnect said driving shaft with said end of the ahead pinion-carrying shaft, a second magnetic particle clutch mounted externally of the gear housing and adapted to drivingly interconnect the driving shaft and said end of the astern pinion-carrying shaft, and a third magnetic particle clutch mounted externally of the gear housing and adapted to drivingly interconnect said end of the astern bull gear carrying shaft with the output driven shaft.

3. A power transmitting mechanism comprising, in combination, a housing, two hollow shaft members rotatably mounted in said housing in spaced axial relation and having a driving shaft rotatably mounted therein, a driven shaft rotatably mounted in said housing in spaced relation to said driving shaft, said driving shaft and the oppositely disposed ends of said hollow shaft members projecting externally of said housing, a first means for drivingly interconnecting said driven shaft with one of said hollow shaft members, a second means for drivingly interconnecting said driven shaft with the other of said hollow shaft members, and magnetic particle coupling means mounted externally of said housing for selectively interconnecting said driving shaft with the projecting ends of said hollow shaft members.

4. A transmission comprising, in combination, a gear housing, lubricant supply means within said housing, a driving shaft and a driven shaft rotatably mounted in said housing, and means for drivingly interconnecting said driven shaft with said driving shaft to provide different drive ratios therebetween, said means including a plurality of gears rotatably mounted on at least one of said shafts, said gears having hubs associated therewith projecting externally of said housing and sealed with respect to said housing and said one shaft, and magnetic particle couplings mounted externally of said gear housing for selectively interconnecting said driving shaft with each of said hubs.

5. In a power transmitting mechanism, the combination comprising an input shaft and an output shaft, a first means for drivingly interconnecting said shafts and adapted to impart a rotation to said output shaft in one rotational direction, said means including a magnetic particle coupling adapted to provide controllable slippage between said shafts, and a second means for drivingly interconnecting said shafts and adapted to impart rotation to said output shaft in a direction opposite to that imparted by said first means, said second means including a first magnetic particle coupling means for drivingly connecting said second means to said input shaft and a second magnetic particle coupling means for connecting said second means to said output shaft.

6. A power transmitting mechanism including a driving shaft and a driven shaft, a first means for drivingly interconnecting said shafts and adapted to transfer rotation of said driving shaft into rotation to said driven shaft, said first means including coupling means for providing controllable slippage between said shafts, and a second means for drivingly interconnecting said shafts and adapted to impart a rotation to said driven shaft differing from that imparted to said driven shaft through said first means, said second interconnecting means including a first coupling means for drivingly connecting said second interconnecting means to said driving shaft and a second coupling means for connecting said second interconnecting means to said output shaft, and at least one of said last two mentioned coupling means being adapted to provide controlled slippage between said input and output shafts.

7. In a transmission including a prime mover driven input shaft and a power output shaft, the combination comprising, a first means for drivingly interconnecting said shafts including a first coupling means, and a second means for drivingly interconnecting said shafts and adapted to impart rotation to said output shaft differing in ratio from that imparted to said output shaft by said first means, said second means including a second coupling means for drivingly connecting said second means to said input shaft and a third coupling means for connecting said second means to said output shaft, said coupling means being adapted to provide controlled slippage between said input and output shafts.

8. In a power transmitting mechanism, a prime mover driven input shaft and a power output shaft, a first gear means for effecting a driving connection between said shafts, a first coupling means for drivingly interconnecting said shafts through said first gear means, a second gear means for effecting a different driving connection between said shafts, a second coupling means for drivingly connecting said second gear means to said input shaft, and a third coupling means for drivingly connecting said second gear means to said output shaft.

9. A transmission comprising, in combination, a housing, lubricant supply means within said housing, two axially aligned hollow shaft members rotatably mounted in said housing, said hollow shafts having a driving shaft rotatably mounted therein, a driven shaft rotatably mounted in said housing in spaced relation to said driving shaft, at least one end of said driving shaft and each of said hollow shaft members having an end projecting externally of said housing, the projecting ends of each of said hollow shafts terminating adjacent a projecting end of said driving shaft, lubricant sealing means interposed between said shaft ends and said housing, a first means for drivingly interconnecting said driven shaft with one of said hollow shaft members, a second means for drivingly interconnecting said driven shaft with the other of said hollow shaft members, and magnetic particle coupling means mounted externally of said housing for selectively interconnecting said driving shaft with the projecting ends of said hollow shaft members, said coupling means including magnetic particle sealing means independent of said lubricant sealing means.

10. A transmission comprising, in combination, a gear housing, lubricant supply means within said housing, a driving shaft and a driven shaft rotatably mounted in said housing, and means for drivingly interconnecting said driven shaft with said driving shafts to provide different ratios therebetween, said means including a plurality of gears rotatably mounted on at least one of said shafts, said gears having hubs associated therewith projecting externally of said housing, means for sealing said hubs with respect to said housing and said one shaft to prevent the loss of lubricant from said housing, magnetic particle couplings mounted externally of said reverse gear housing for selectivity interconnecting said driving shaft with each of said hubs, and magnetic particle sealing means associated with said coupling means independently of said lubricant sealing means.

11. In a power transmitting mechanism as set forth in claim 2, control means including a control lever movable from a neutral position through a first range to selectively and progressively energize said first magnetic particle clutch and movable from said neutral position through a second range to selectively and progressively energize said second and third magnetic particle clutches.

12. In a power transmitting mechanism as set forth in claim 2, control means including a control lever movable from a neutral position through a first range to progressively energize said first magnetic particle clutch and movable from said neutral position through a second range to energize sequentially one of said second and third magnetic particle clutches and then to energize the other of said second and third clutches progressively.

13. In a power transmitting mechanism as set forth in claim 6, control means including a control lever, said control means being operable upon movement of said control lever from a neutral position through a first range to energize the coupling means of said first means progressively to control the slippage between said shafts and being operable upon movement of said control lever from said neutral position through a second range to energize the other of said first and second coupling means of said interconnecting means to establish its driving connection and to progressively energize said one coupling means to provide controlled slippage between said shafts.

References Cited in the file of this patent

UNITED STATES PATENTS

| | | |
|---|---|---|
| 2,304,032 | Schmitter | Dec. 1, 1942 |
| 2,511,039 | Black et al. | June 13, 1950 |
| 2,718,157 | Schaub | Sept 20, 1955 |